United States Patent
Nemeth et al.

(10) Patent No.: US 11,036,224 B2
(45) Date of Patent: Jun. 15, 2021

(54) SYSTEM AND METHOD FOR TRANSFER OF A UTILITY VEHICLE

(71) Applicant: KNORR-BREMSE SYSTEME FUER NUTZFAHRZEUGE GMBH, Munich (DE)

(72) Inventors: Huba Nemeth, Budapest (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 143 days.

(21) Appl. No.: 16/330,117

(22) PCT Filed: Aug. 14, 2017

(86) PCT No.: PCT/EP2017/070642
§ 371 (c)(1),
(2) Date: Mar. 4, 2019

(87) PCT Pub. No.: WO2018/046253
PCT Pub. Date: Mar. 15, 2018

(65) Prior Publication Data
US 2019/0250608 A1    Aug. 15, 2019

(30) Foreign Application Priority Data
Sep. 8, 2016 (DE) .................. 10 2016 116 858.0

(51) Int. Cl.
*G05D 1/00* (2006.01)
*B60W 30/00* (2006.01)
*G08G 1/00* (2006.01)

(52) U.S. Cl.
CPC ........... *G05D 1/0061* (2013.01); *B60W 30/00* (2013.01); *G05D 2201/0213* (2013.01); *G08G 1/20* (2013.01)

(58) Field of Classification Search
CPC ........ G05D 1/0061; G05D 2201/0213; B60W 30/00; B60W 60/005; G08G 1/20; G08G 1/16
See application file for complete search history.

(56) References Cited

U.S. PATENT DOCUMENTS

2009/0248231 A1    10/2009 Kamiya
2014/0052312 A1    2/2014 Stadler
(Continued)

FOREIGN PATENT DOCUMENTS

DE    10322765 A1    1/2005
DE    102012016432 A1    2/2014
(Continued)

OTHER PUBLICATIONS

International Search Report dated Nov. 29, 2017, of the corresponding International Application PCT/EP2017/070642 filed Aug. 14, 2017.

*Primary Examiner* — Brian P Sweeney
(74) *Attorney, Agent, or Firm* — Norton Rose Fulbright US LLP; Gerard Messina

(57) ABSTRACT

A system for transferring a utility vehicle between a driver and a management system in order to autonomously operate the utility vehicle in a restricted area, including: a vehicle interface to allow the driver to request the transfer of the utility vehicle; a safety module to establish a safe state of the utility vehicle; and a control module to transfer the vehicle between the driver and the management system if the driver has requested the transfer and the safety module has established the safe state. Also described are a related utility vehicle, a management system, a method, and a computer readable medium.

13 Claims, 4 Drawing Sheets

(56) References Cited

U.S. PATENT DOCUMENTS

2015/0283998 A1  10/2015  Lind et al.
2015/0284009 A1  10/2015  Cullinane et al.
2016/0200326 A1   7/2016  Cullinane et al.

FOREIGN PATENT DOCUMENTS

| | | |
|---|---|---|
| DE | 2014221264 A1 | 4/2015 |
| DE | 102014224124 A1 | 6/2016 |
| DE | 102015201209 A1 | 7/2016 |
| DE | 102015209137 A1 | 11/2016 |
| EP | 1480097 A2 | 11/2004 |
| JP | H10230843 A | 9/1998 |
| JP | 2015056134 A | 3/2015 |
| JP | 2015133050 A | 7/2015 |
| JP | 2015210595 A | 11/2015 |
| JP | 201631660 A | 3/2016 |
| RU | 2380725 | 1/2010 |
| WO | 2015037442 A1 | 3/2015 |
| WO | WO 2015-037442 A1 * | 3/2015 |
| WO | 2015151291 A1 | 10/2015 |
| WO | 2016092796 A1 | 6/2016 |
| WO | WO 2016-046979 A1 * | 6/2016 |

\* cited by examiner

SYSTEM AND METHOD FOR TRANSFER OF A UTILITY VEHICLE

FIELD OF THE INVENTION

The present invention relates to a system and a method for transferring a utility vehicle between a driver and a management system and, in particular, to transfer/acceptance of utility vehicles for autonomous operation.

BACKGROUND INFORMATION

Autonomously operated utility vehicles are gaining increasing interest, but the corresponding systems are technically highly complex. In order to initially make the autonomous operations manageable, such systems could be initially used in restricted areas (for example loading bays). The number and variety of potential disturbances can be kept low in the restricted areas, for example, and the system can operate with low-speed utility vehicles.

In order to ensure safety in the autonomous mode and to also enable continuous operation, the responsibilities should always be clearly controlled and a well-defined transfer and acceptance process between the human driver and the system (that is to say the machine) or another person assuming control of the vehicle is important.

Solutions for autonomous operation of vehicles relate substantially to automobiles but not to utility vehicles and the special features associated with the latter. For example, DE 10 2015 201 209 discusses a control unit which implements a parking service (valet parking) for automobiles. Patent document US 2016/200326 also discusses an autonomous driving mode, wherein vehicle states are first of all checked and a driver processes a checklist in order to determine whether the vehicle can be switched to an autonomous mode. Patent document US 2009/248231 also discusses a system which can switch between a manual mode and an autonomous mode for vehicles.

These are either specific systems which provide advantages for automobiles but are scarcely relevant to utility vehicles (for example a parking service) or require the presence of the driver and are therefore inefficient. In addition, they do not make it possible for particular actions to be carried out with the utility vehicle or for valuable working time to be saved for the driver.

SUMMARY OF THE INVENTION

Therefore, there is a need for systems for operating utility vehicles which solve at least some of the problems mentioned above. This is achieved by a system and a method for transferring a utility vehicle as described herein, a utility vehicle as described herein and a management system as described herein. The further descriptions herein define further advantageous embodiments.

The present invention relates to a system for transferring a utility vehicle between a driver and a management system which makes it possible to autonomously operate the utility vehicle in a restricted area. The system comprises a vehicle interface, a safety module and a control module. The vehicle interface is configured to make it possible for the driver to request the transfer of the utility vehicle. The safety module is configured to establish a safe state of the utility vehicle. The control module is configured to transfer the vehicle between the driver and the management system if the driver has requested the transfer and the safety module has established the safe state.

Within the scope of the present invention, the restricted area may comprise any region to which access/entry is not freely possible but rather access control is carried out in order to thus be able to enforce safety guidelines in the region, for example, and to enable safe autonomous actions with or on the utility vehicle. Restricted areas are, for example: loading and unloading stations, halls, loading bays, ferries, aircraft, where utility vehicles are loaded or are used to load goods. A safe state of the utility vehicle may be understood as meaning, for example, such a state in which the utility vehicle can remain for an unlimited time without a risk to persons or machines. Such a state generally depends on the type of restricted area. Examples of a safe state are: a quiescent state, a parked position in a prescribed area, a particular orientation of the vehicle, a drive machine which has been switched off or a combination thereof.

The management system may have, for example, a communication interface and the vehicle interface can be optionally configured to connect to the communication interface in order to thus determine an infrastructure of the restricted area. The safety module can then optionally assess whether the infrastructure is able to control an autonomous operation mode. Querying the infrastructure makes it possible to ensure that the utility vehicle can be transferred only when minimum standards of the restricted area have been met. Such standards may comprise, for example, a sufficient communication connection between the utility vehicle and the management system but may also comprise the presence of certain safety regulations which can be queried if necessary.

The safety module may be optionally configured to carry out the transfer only when the safe state has been established and/or the infrastructure has been assessed as sufficient.

The vehicle interface may optionally comprise a physical interface and/or a software interface which can be fitted or installed (in the case of software interfaces) in or on the utility vehicle in order to be moved together with the vehicle.

If the vehicle interface is present both as a physical interface and as a software interface, the control module can be configured to transfer the vehicle only when both the physical interface and the software interface have been actuated by the driver in order to request the transfer.

The vehicle interface may optionally have at least one of the following elements: a switch, a button, a lever, a pedal, an arrangement for transmitting information, wherein the elements are physically present or can be implemented in software.

The vehicle interface may optionally also be configured to query whether a further participant (or a plurality of participants) is present in the restricted area. In this case, the control module can also be configured to take into account a presence or actions of the further participant when transferring the vehicle from the driver to the management system. The further participant may be, for example, a further autonomously operated vehicle, a machine or else a person who is authorized to stay in the restricted area in order to carry out activities there.

The control module can optionally also be configured to at least temporarily transfer the utility vehicle to a further participant in the restricted area using at least one interface of the further participant. The further participant may be, for example, a person who stays in the restricted area and carries out predetermined activities there (for example maneuvering or loading work), which includes temporary acceptance of the utility vehicle, for example. However, the further participant need not necessarily be a person, but rather may likewise be a subsystem of the management system which implements specific functions which are to be carried out as required (for example approaching a particular parked position).

The vehicle interface can optionally also be configured to request a confirmation from the driver or a further participant, and the control module can be configured to carry out the transfer only when the confirmation has been made at the vehicle interface. In the transfer process mentioned here, a worker or another temporarily acting operator or the driver himself, for example, can confirm the desired acceptance at a switch interface (virtual or real). The confirmation can be effected using a special code, for example. For example, the transferring person can input a code graphically, in the form of text or as a barcode to an input arrangement of the vehicle and can thus confirm the transfer. For this purpose, a mobile device can generate the code which is to be read in as confirmation by a visual sensor of the vehicle. As a result, the intention to want to carry out the transfer can be reliably confirmed (automatically or else manually) either by the utility vehicle itself and/or by the management system or an operator in the restricted area.

The control module can optionally also be configured to determine a presence of the driver in the driver's cab of the utility vehicle (for example using special sensors or by a query via the vehicle interface). The system can then transfer the utility vehicle from the management system to the driver when the driver is physically present in the driver's cab. In particular, a transfer does not need to be carried out if the driver is not in the driver's cab.

The present invention also relates to a utility vehicle having a system as described above.

In addition, the present invention also relates to the management system mentioned which comprises at least the following features: a communication interface and a control unit. The communication interface is configured to establish a connection to the system described above such that the utility vehicle can be accepted from the driver or transferred to the driver. The control unit is configured to autonomously operate the utility vehicle in a restricted area.

The management system does not need to be a central control unit which coordinates the autonomous operation of a multiplicity of vehicles. The management system is initially responsible only for the one vehicle which has been transferred, with the result that the driver no longer has to bear responsibility. It is a machine replacement for the driver of the utility vehicle. However, the management system can communicate with other systems in order to coordinate a multiplicity of autonomous vehicles. It is likewise possible—but not necessary—for the management system to be able to supervise a plurality of utility vehicles at the same time and to coordinate all autonomous actions.

The present invention also relates to a method for transferring a utility vehicle between a driver and the management system in order to autonomously operate the utility vehicle in the restricted area. The method comprises the following steps of: requesting the transfer of the utility vehicle between the driver and the management system; establishing a safe state of the utility vehicle; and transferring the utility vehicle between the driver and the management system if the driver has requested the transfer and the safe state has been established.

This method may likewise be implemented or stored in the form of instructions in software or on a computer program product, wherein stored instructions are able to carry out the steps according to the method if the method runs on a processor (for example one of the vehicle control units). Therefore, the present invention likewise relates to a computer program product having software code (software instructions) which is stored thereon and is configured to carry out one of the methods described above when the software code is executed by a processing unit. The processing unit may be any form of computer or control unit having a corresponding microprocessor which can execute a software code.

The present invention solves at least some of the problems mentioned at the outset by using an acceptance/transfer process and corresponding interfaces (in particular for utility vehicles) within autonomous driving systems, with the result that the utility vehicles can be autonomously operated within the restricted area. In this case, a physical and/or virtual interface which controls the operation mode of the vehicle is used, in particular.

In comparison with the known systems, exemplary embodiments provide a number of advantages.

In contrast to the known solutions, exemplary embodiments do not require a central control unit but ensure at any time that the responsibility during transfer and acceptance is always clearly controlled. In particular, according to the invention, it is not necessary—and often also not desired—for the driver to be present in the vehicle during the autonomous mode of operation. Exemplary embodiments define a clear return process from the management system to the driver of the utility vehicle.

One advantage of using the system in restricted areas is that restricted areas can ensure a sufficient infrastructure and technical equipment for safe operation of the utility vehicle for the autonomous driving function. If the utility vehicle has entered a restricted area which supports autonomous operation, an autonomous mode is transparently detected according to exemplary embodiments, to be precise using a method and interfaces which permanently ensure that the responsibility for the vehicle is always clearly assigned.

The exemplary embodiments of the present invention are better understood from the following detailed description and the accompanying drawings of the different exemplary embodiments which, however, should not be understood as meaning that they restrict the disclosure to the specific embodiments but rather are only used for explanation and understanding.

DETAILED DESCRIPTION

Figure 1:
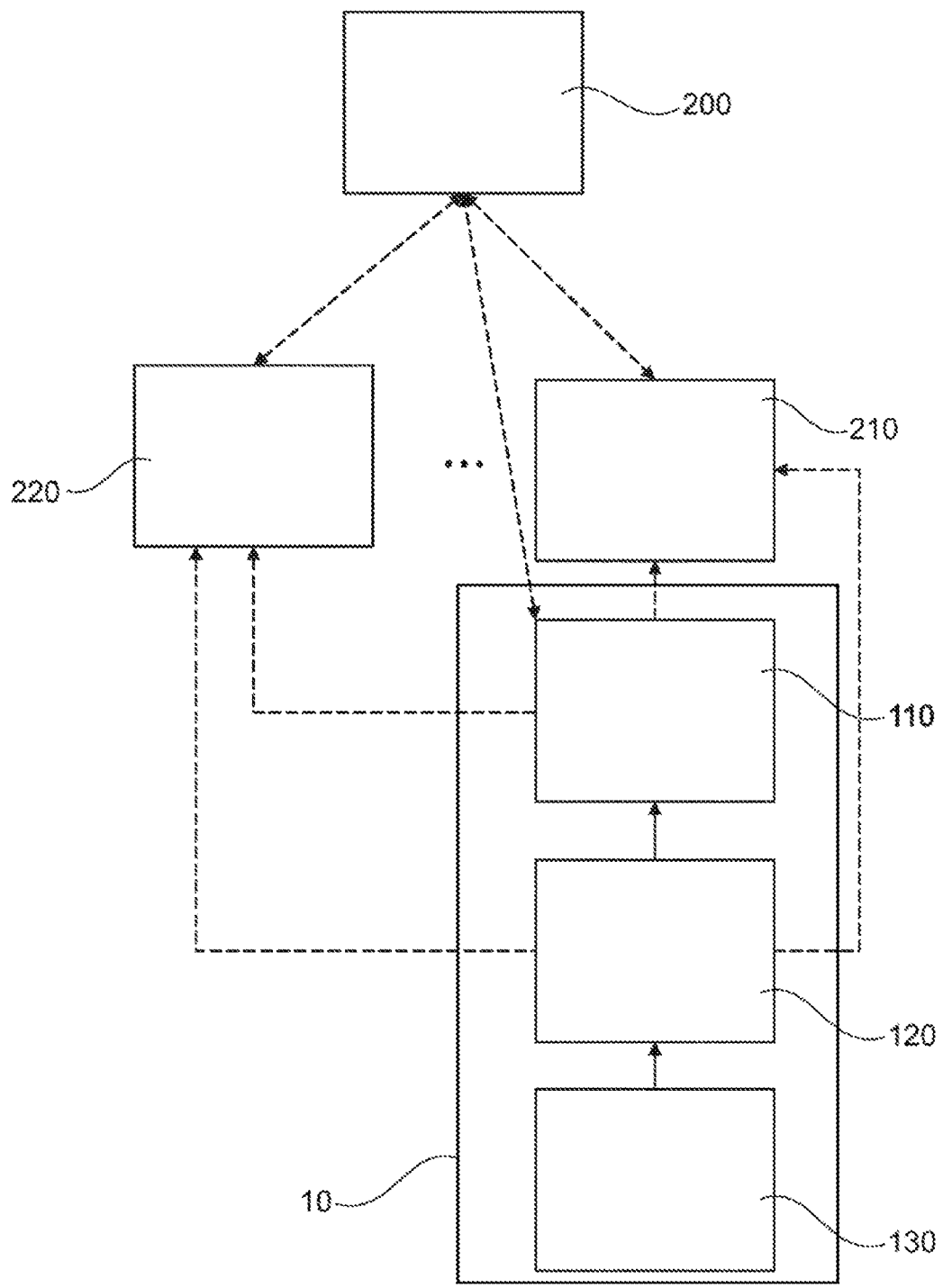
FIG. 1 shows an exemplary embodiment of a system for transferring a utility vehicle between a driver and a management system.

FIG. 1 shows a system which is suitable for transferring a utility vehicle 10 between a driver and a management system 200, wherein the management system 200 is able to autonomously operate the utility vehicle 10 in a restricted area. The system comprises a vehicle interface 110, a safety module 120 and a control module 130. The vehicle interface 110 allows the driver to request the transfer of the utility vehicle 10. The safety module 120 is able to establish a safe state of the utility vehicle 10, and the control module 130 is configured to transfer the vehicle 10 between the driver and the management system if the driver has requested the transfer and the safety module has established the safe state.

The system may be implemented in the utility vehicle 10, for example, either as a hardware component or as software within a control unit. The management system 200 may also be coupled to further participants. For example, a first participant may have an interface 210 which is in contact with the management system 200 and may be in the form of a physical or else virtual interface. Further participants may comprise further physical or virtual interfaces 220 which are likewise connected to the management system 200. It is likewise possible for the management system 200 itself to have an interface.

A human operator/user, for example, can communicate with the management system 200 or with the other components using these interfaces and can provide an express confirmation for the transfer of a vehicle 10. The vehicle interface 110 is likewise not only configured to make contact with the management system 200 but rather may likewise interchange information with the further interfaces 210, 220 of the further participants. On the basis of this, the safety module 120 can determine whether the utility vehicle 10 is in a safe state and the transfer can be carried out. For this purpose, it is possible for the safety module 120 to make direct contact with the further participants 210, 220 in order to obtain a safety confirmation.

It goes without saying that FIG. 1 shows only a simplified diagram for a combined system for transferring utility vehicles 10 to a management system 200. The dashed lines relate to connections which are optionally present, with the result that the corresponding interchange of information can be implemented along the dashed lines in a specific system. However, the extent to which the connections are formed depends on the specific conditions. For example, it may be useful in some applications to use or else to not use virtual (computerized or display-based) control interfaces. The control process may likewise be undertaken or else may not be undertaken by a central control unit.

Figure 2:
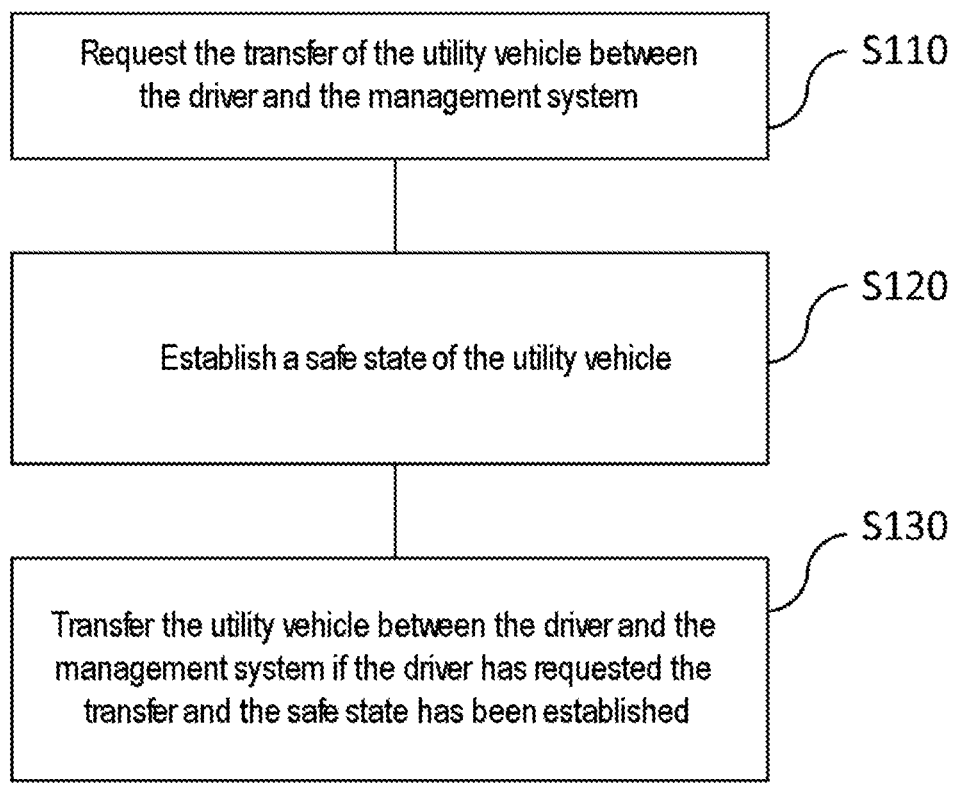
FIG. 2 shows a flowchart for a method for transferring the utility vehicle between the driver and the management system.

FIG. 2 shows a flowchart for a method for transferring the utility vehicle 10 between a driver and a management system 200 in order to autonomously operate the utility vehicle 10 in the restricted area. The method comprises the steps of: requesting S110 the transfer of the utility vehicle between the driver and the management system 200; establishing S120 a safe state of the utility vehicle 10; and transferring S130 the utility vehicle 10 between the driver and the management system 200 if the driver has requested the transfer and the safe state has been established.

The method or at least parts of the latter may likewise be computer-implemented, that is to say the method can be implemented by instructions which are stored on a storage medium and are able to carry out the steps of the method when it runs on a processor. The instructions typically comprise one or more instructions which can be stored in different ways on different media in or peripheral to a control unit (having a processor) and, when read and executed by the control unit, cause the control unit to carry out functions, functionalities and operations which are needed to carry out a method according to the present invention.

Figure 3:
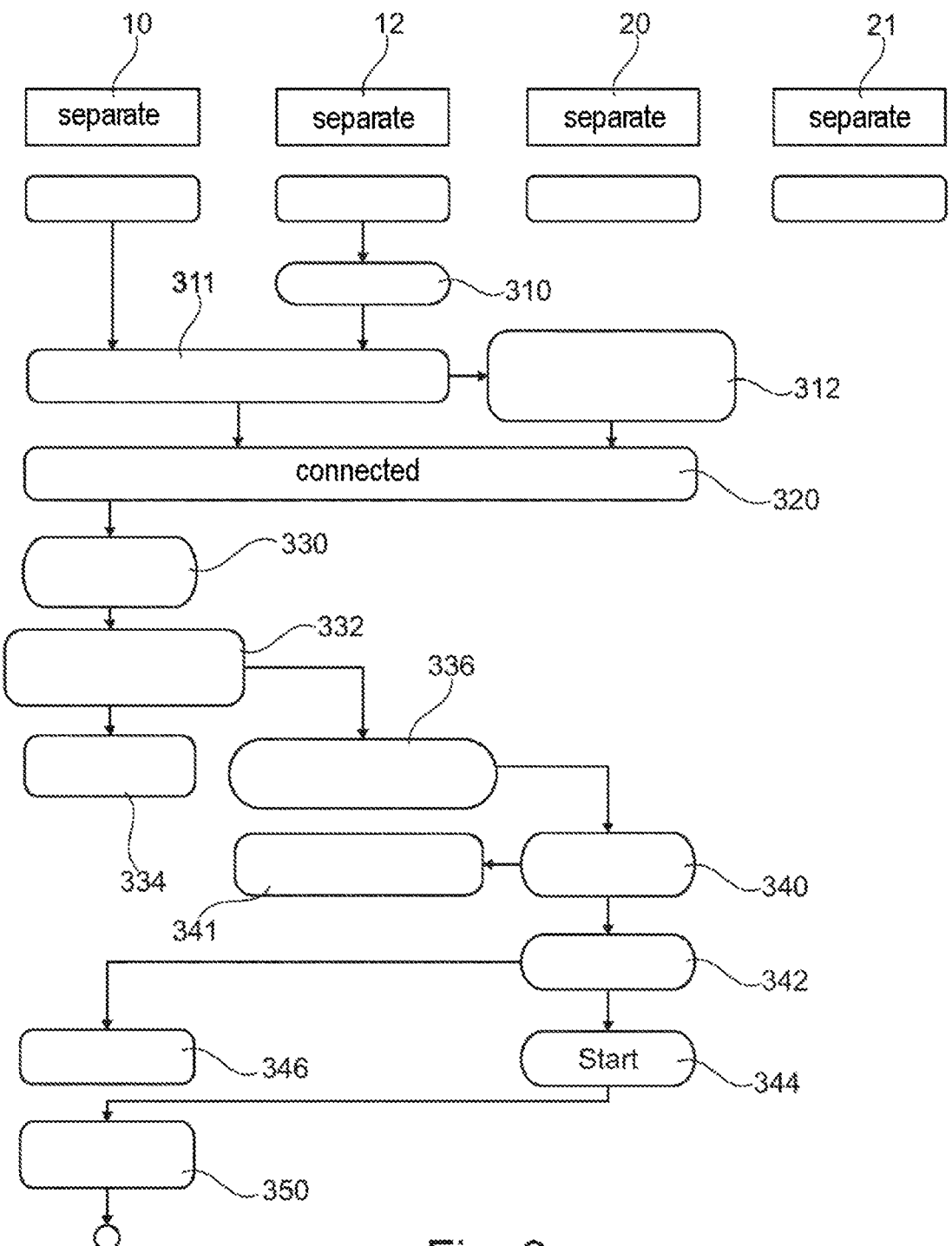
FIG. 3 shows a state diagram for process control when transferring/accepting a utility vehicle for autonomous operation using the system according to exemplary embodiments.
Figure 3:
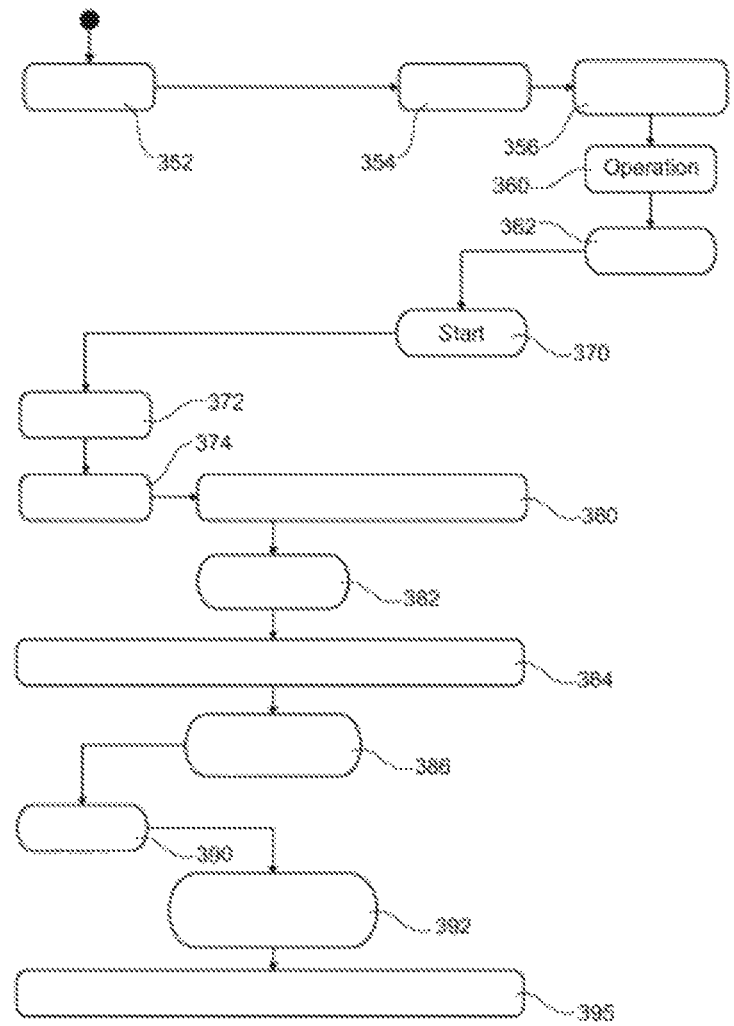

FIG. 3 shows a state diagram for implementing the system for autonomously operating a utility vehicle 10 in a restricted area. For the situation shown, one or more participants 21 can carry out different operations on the vehicle 10 (loading or unloading, washing, maintenance, refueling, etc.). The state diagram describes the transfer and acceptance between the driver 12 of the utility vehicle 10 and a (virtual or real) manager 20 of the restricted area, wherein interactions between the participants 12, 21 and the vehicle 10 are illustrated.

The state diagram assumes that a physical interface (switch, button, lever, etc.) and a virtual interface (for example mobile application) are present in the utility vehicle 10, whereas the other participants 20, 21 (for example the manager of the restricted area or worker) are able to influence the behavior of the system, for example via a virtual control interface, for example a computer, a mobile radio device, a tablet, etc. However, these interfaces should be understood only as an example and need not necessarily be configured in this manner. A worker 21 can perform actions on the utility vehicle 10, for example, wherein the worker 21 can or should assume responsibility for the utility vehicle 10 in this case.

According to exemplary embodiments, the infrastructure of the restricted area provides wireless communication (for example to the Internet), with the result that all participants 12, 20, 21 and the utility vehicle 10 are connected to one another. The utility vehicle 10 is set to a corresponding mode and remains in this mode. Within the scope of the present invention, "operations" which are carried out by a worker 21 may relate to all possible utility vehicles 10 (trucks, a vehicle combination, buses, agricultural vehicles, etc.) and to all corresponding operations which can be carried out in a restricted area.

In detail, the state diagram in FIG. 3 shows the following situation:

In an initial state, the utility vehicle 10, the driver 12, a manager 20 of the restricted area and a further participant 21 are separate from one another. For example, upon approaching the restricted area, the driver 12 can make a connection request. In response to detecting the restricted area (state 310), both the vehicle 10 and the driver 12 can connect to the restricted area (state 311). It is likewise possible for the combination of the driver and the vehicle to connect to the restricted area as a unit (state 312).

A connection can be established in response to this (state 320). It is optionally possible for an interface in the management system 200 to have to be actuated by the manager 20 (for example a button must be pressed) in order to continue the transfer process (state 330). A safety check can then be carried out and it can be determined whether an autonomous operation is possible in the restricted area with the present infrastructure (state 332). A waiting state can then follow (state 334) or a request to transfer the vehicle can be made (state 334). The transfer of the vehicle then follows (state 340).

A waiting position may optionally be necessary since potential (docking) stations are occupied (state 341). If this is not the case, the (docking) stations to be approached can be stipulated (state 342). An optional waiting position can again be adopted in the restricted area (state 346). The autonomous operation can also be immediately started (state 344). The utility vehicle is then autonomously moved in the restricted area (state 350) and docking at a desired station is carried out (state 352) which is concluded in state 354.

A confirmation can then be given of the fact that the vehicle is ready for the action/operation at the station (state 356) and the operation is carried out (state 360). After the operation has been concluded (state 362), an (autonomous) movement of the vehicle 10 through the restricted area (state 372) is started (state 370) again. In state 374, the utility vehicle reaches the last target position and waits for the driver 12 (state 380).

It is then possible to check (state 382) whether the driver 12 has actuated the brake pedal and whether the driver 12 is present in the driver's cab (state 384). If this is the case, a transfer button can be pressed (state 386), whereupon the management system 200 triggers a switch (state 390), whereupon the driver 12 can actuate a separation switch (state 392) and the vehicle is separated from the management system (state 395).

The acceptance/transfer process shown between a manual mode and an autonomous mode can be implemented by the management system 200 or a submodule which checks a safe state for the vehicle. As a result, it should always be ensured that the vehicle 10 always remains in a safe state.

The manager 20 for the restricted area (a person or else a machine) can optionally be used to monitor the transfer and acceptance process or else to actively take part in the latter. In these cases, the switching between the manual mode and the autonomous mode may depend not only on the fact that a safe state is present but rather that a suitable restricted area and/or a corresponding decision by a person or a machine (manager of the restricted area) is/are likewise present. Only then is it possible to successfully switch between the manual mode and the autonomous mode in these cases. As a result, an additional safety confirmation can be implemented by the system.

As already mentioned, the system in any case ensures that the driver 12 retains responsibility for any vehicle-based action until the utility vehicle 10 has reached a safe state. As already stated, the safe state can be any state in which the utility vehicle can remain for a long period without being a risk to a person and machines. If the safe state has been reached and confirmed by the system, the driver 12 can be offered the chance to transfer the responsibility for the utility vehicle 10 to the management system 200 for the restricted area or to an operator (who may also be a person, for example). This offer to the driver 12 may comprise a request to switch on a switch as confirmation of the autonomous mode.

From this time on, until the end of the autonomous operation, the management system 200 is responsible for the vehicle 10 and is likewise responsible for all vehicle-based activities. When the autonomous operation mode has ended, the driver 12 can return to the utility vehicle 10 (see states 380-395) and can again assume control of the utility vehicle 10. For example, a physical interaction (for example actuation of a switch) with the vehicle 10 may be required to initiate the return process and thus regain control of the utility vehicle 10. If the driver 12 has assumed responsibility for the vehicle 10, the initial state (manual state) of the vehicle 10 can be activated again. The utility vehicle 10 can then be operated manually by the driver 12 again.

The features of the invention disclosed in the description, the claims and the figures can be essential to the implementation of the invention both individually and in any desired combination.

THE LIST OF REFERENCE SIGNS IS AS FOLLOWS

10 Utility vehicle
12 Driver
20 Manager of the restricted area
21 Further participants/workers
110 Vehicle interface
120 Safety module
130 Control module
200 Management system
210, 220, . . . Interface of further participants

The invention claimed is:

1. A system for transferring a utility vehicle between a driver and a management system to autonomously operate the utility vehicle in a restricted area, comprising:
   a vehicle interface to allow the driver to request, from a control unit of the management system, the transfer of the utility vehicle between the driver and the control unit of the management system to autonomously operate the utility vehicle in a restricted area;
   a safety module to establish a safe state of the utility vehicle, wherein the safety module is at least coupled to the vehicle interface; and
   a control module, coupled to the safety module, to control transfer of the vehicle between the driver and the management system if the driver has requested the transfer and the safety module has established the safe state;
   wherein at least one of the following is satisfied:
      the control module is configured to at least temporarily transfer the utility vehicle to a further participant in the restricted area using at least one interface of the further participant, and/or
      the vehicle interface is configured to request a confirmation from the driver or the further participant, and wherein the control module is configured to carry out the transfer only when the confirmation has been made at the vehicle interface.

2. The system of claim 1, wherein the management system has a communication interface, wherein the vehicle interface is also configured to connect to the communication interface and to determine an infrastructure of the restricted area, and wherein the safety module is configured to assess whether the infrastructure is able to control an autonomous operation mode.

3. The system of claim 1, wherein the safety module is configured to carry out the transfer only when the safe state has been established and/or the infrastructure has been assessed as sufficient.

4. The system of claim 1, wherein the vehicle interface includes a physical interface or a software interface which can be fitted or installed in or on the utility vehicle to be moved together with the vehicle.

5. The system of claim 1, wherein the vehicle interface includes a physical interface and a software interface, and wherein the control module is configured to transfer the vehicle only when the physical interface and the software interface have been actuated by the driver to request the transfer.

6. The system of claim 4, wherein the vehicle interface has at least one of the following elements: a switch, a button, a lever, a pedal, means for transmitting information, wherein the elements are physical or are implemented in software.

7. The system of claim 1, wherein the vehicle interface is also configured to query whether a further participant is present in the restricted area, and wherein the control module is also configured to take into account a presence or actions of the further participant when transferring the vehicle from the driver to the management system.

8. The system of claim 1, wherein the control module is configured to at least temporarily transfer the utility vehicle to the further participant in the restricted area using the at least one interface of the further participant.

9. The system of claim 1, wherein the vehicle interface is configured to request the confirmation from the driver or the further participant, and wherein the control module is configured to carry out the transfer only when the confirmation has been made at the vehicle interface.

10. The system of claim 1, wherein the control module is configured to determine a presence of the driver in the driver's cab of the utility vehicle and to transfer the utility vehicle from the management system to the driver when the driver is physically present in the driver's cab.

11. A utility vehicle, comprising:
a system for transferring a utility vehicle between a driver and a management system to autonomously operate the utility vehicle in a restricted area, including:
a vehicle interface to allow the driver to request, from a control unit of the management system, the transfer of the utility vehicle between the driver and the control unit of the management system to autonomously operate the utility vehicle in a restricted area;
a safety module to establish a safe state of the utility vehicle, wherein the safety module is at least coupled to the vehicle interface; and
a control module, coupled to the safety module, to control transfer of the vehicle between the driver and the management system if the driver has requested the transfer and the safety module has established the safe state;
wherein at least one of the following is satisfied:
the control module is configured to at least temporarily transfer the utility vehicle to a further participant in the restricted area using at least one interface of the further participant, and/or
the vehicle interface is configured to request a confirmation from the driver or the further participant, and wherein the control module is configured to carry out the transfer only when the confirmation has been made at the vehicle interface.

12. A management system for a restricted area, comprising:
a communication interface to establish a connection to a system to accept a request to transfer control of a utility vehicle from a driver or to the driver; and
a control unit, in the management system, to autonomously operate the utility vehicle in a restricted area;
wherein the system is for transferring the utility vehicle between the driver and the management system to autonomously operate the utility vehicle in a restricted area, including:
a vehicle interface to allow the driver to request, from a control unit of the management system, the transfer of the utility vehicle between the driver and the control unit of the management system to autonomously operate the utility vehicle in a restricted area;
a safety module to establish a safe state of the utility vehicle, wherein the safety module is at least coupled to the vehicle interface; and
a control module, coupled to the safety module, to control transfer of the vehicle between the driver and the management system if the driver has requested the transfer and the safety module has established the safe state;
wherein at least one of the following is satisfied:
the control module is configured to at least temporarily transfer the utility vehicle to a further participant in the restricted area using at least one interface of the further participant, and/or
the vehicle interface is configured to request a confirmation from the driver or the further participant, and wherein the control module is configured to carry out the transfer only when the confirmation has been made at the vehicle interface.

13. A method for transferring a utility vehicle between a driver and a management system to autonomously operate the utility vehicle in a restricted area, the method comprising:
providing a request to a control unit of the management system, via a vehicle interface of a system, a transfer of the utility vehicle between the driver and the control unit of the management system to autonomously operate the utility vehicle in a restricted area;
establishing, via a safety module, a safe state of the utility vehicle, wherein the safety module is at least coupled to the vehicle interface; and
transferring, via a control module, control of the utility vehicle between the driver and the management system if the driver has requested the transfer and the safe state has been established state;
wherein at least one of the following is satisfied:
the control module is configured to at least temporarily transfer the utility vehicle to a further participant in the restricted area using at least one interface of the further participant, and/or
the vehicle interface is configured to request a confirmation from the driver or the further participant, and wherein the control module is configured to carry out the transfer only when the confirmation has been made at the vehicle interface.

* * * * *